US006062116A

United States Patent [19]

Morioka et al.

[11] Patent Number: 6,062,116

[45] Date of Patent: May 16, 2000

[54] METHOD OF MANUFACTURING HOLLOW SHAFT AND MANDREL FOR HOLDING CYLINDRICAL HOLLOW SHAFT BLANK

[75] Inventors: Takeshi Morioka; Taizou Kitamura; Tatsuo Ichinokawa, all of Wako, Japan

[73] Assignee: Honda Giken Kogyo K.K., Tokyo, Japan

[21] Appl. No.: 09/095,901

[22] Filed: Jun. 11, 1998

[30] Foreign Application Priority Data

Jun. 13, 1997 [JP] Japan .................................... 9-156201
Aug. 8, 1997 [JP] Japan .................................... 9-214329

[51] Int. Cl.[7] ............................... B23B 1/00; B23B 31/02

[52] U.S. Cl. ................................. 82/1.11; 82/47; 82/162; 82/168

[58] Field of Search .............................. 82/1.11, 47, 150, 82/170, 162, 168, 169; 279/156, 121

[56] References Cited

U.S. PATENT DOCUMENTS 4,387,906 6/1983 Nicolin .
4,828,198 5/1989 Kann et al. .
5,397,135 3/1995 Smith .

FOREIGN PATENT DOCUMENTS 51-137775 11/1976 Japan .
55-070906 U 5/1980 Japan .
0082101 7/1981 Japan ...................................... 82/1.11
0295101 12/1988 Japan ...................................... 82/1.11
7-9312 1/1995 Japan .
7-136817 5/1995 Japan .
8-243815 9/1996 Japan .

*Primary Examiner*—Henry W. H. Tsai
*Attorney, Agent, or Firm*—Birch, Stewart, Kolasch & Birch, LLP

[57] ABSTRACT

A hollow shaft is manufactured by defining a through hole axially in a shaft blank to produce a cylindrical hollow shaft blank, inserting a mandrel in the through hole of the hollow shaft blank, holding opposite ends of the mandrel concentrically with the through hole, and rotating the hollow shaft blank about its own axis while cutting an outer circumferential surface of at least one end of the hollow shaft blank concentrically with the through hole to form a reference outer circumferential surface on the at least one end of the hollow shaft blank. After the reference outer circumferential surface is formed, it is held in position, and the hollow shaft blank is rotated about its own axis while cutting a predetermined thickness of an outer circumferential surface of the hollow shaft blank over a substantially entire length thereof for thereby finishing the hollow shaft blank into a hollow shaft.

8 Claims, 8 Drawing Sheets

12 14 18 29 22 24 16 13 13 17 25 23 30 19 15 W 36 35 33 20 14 W1 24 25 15 21 W 34

12
34
36
W
W
15
21
15
19
15
30
23
25
17
25
13
13
16
24
22
24
29
18
$W_1$
14
14
14
20
35
33

W
W
13
16
24
24
29
22
20
14
18
18
14
20
32
18
37
33
31
39
40
40
40
40
38

12
Z
15
17
23
25
y
13
x
24
22
16
14
12

METHOD OF MANUFACTURING HOLLOW SHAFT AND MANDREL FOR HOLDING CYLINDRICAL HOLLOW SHAFT BLANK

BACKGROUND OF THE INVENTION

1. Field of the Invention

The present invention relates to a method of manufacturing a hollow shaft, and a mandrel for holding a relatively long hollow shaft blank.

2. Description of the Related Art

According to one conventional process of manufacturing a relatively long hollow shaft, an axial deep hole is drilled in a shaft blank in the form of a solid cylinder by a gun drill, and then a thin hole is drilled in the shaft blank by a drill, so that a through hole is formed in the shaft blank. Then, a mandrel in the form of a solid cylinder is inserted into the through hole in the hollow shaft blank. The mandrel has an outside diameter which is substantially the same as the inside diameter of the through hole in the hollow shaft blank, and is longer than the hollow shaft blank. When the mandrel is inserted into the through hole in the hollow shaft blank, the mandrel holds the hollow shaft blank substantially concentrically therewith, and has its opposite ends held between the centers of a lathe or the like. Thereafter, while the hollow shaft blank supported on the mandrel is rotating, the hollow shaft is machined at its outer circumferential surface, thereby producing a hollow shaft.

Details of the manner in which the hollow shaft blank is supported on the mandrel will be described below. As shown in FIG. 8 of the accompanying drawings, a mandrel 50 comprises a main stem 53 whose outer circumferential surface is held almost in its entirety against the cylindrical surface which defines a through hole 52 in a hollow shaft blank 51, and an extension stem 54 extending coaxially from an end of the main stem 53. The through hole 52 in the hollow shaft blank 51 includes a smaller-diameter portion 55 at an end thereof in which the extension stem 54 is inserted. A radial step defined by the smaller-diameter portion 55 in the hollow shaft blank 51 is engaged by a radial step defined between the main and extension stems 53, 54 of the mandrel 50, and a nut 56 is threaded over the outer end of the extension stem 54 which projects out of the hollow shaft blank 51, thereby securely holding the mandrel 50 in the hollow shaft blank 51. For machining the outer circumferential surface of the hollow shaft blank 51, the mandrel 50 held between the centers of a lathe is rotated about its own axis to rotate the hollow shaft blank 51 about its own axis.

Since the mandrel 50 is removably inserted in the through hole 52 in the hollow shaft blank 51, the mandrel 50 is slightly smaller in diameter than the through hole 52 in the hollow shaft blank 51. Therefore, there is a very small clearance of about 30 $\mu$m between the outer circumferential surface of the mandrel and the cylindrical surface which defines the through hole 52 in the hollow shaft blank 51. Due to this clearance, it is impossible to keep the hollow shaft blank 51 and the mandrel 50 concentric with each other highly accurately, and hence to keep the concentricity of the hollow shaft blank 51 at a high level, i.e., to eliminate a misalignment between the axes of inner and outer circumferential surfaces of the hollow shaft blank 51. When the hollow shaft blank 51 is rotated through the mandrel 50, the hollow shaft blank 51 tends to vibrate radially, and cannot be machined highly accurately at its outer circumferential surface.

Hollow shafts of this type are used as aircraft gas turbine shafts, for example, and should preferably have a very high level of concentricity ranging from 10 to 20 $\mu$m. Those hollow shafts are often made of difficult-to-machine materials including nickel-based super alloys and stainless-steel-based alloys, for example. Therefore, it is relatively difficult to machine those hollow shafts.

Hollow shafts that are manufactured in the manner described above have a relatively low level of concentricity ranging from 70 to 120 $\mu$m, and cannot be machined with accuracy if they are made of difficult-to-machine materials. Accordingly, the hollow shafts thus manufactured are not suitable for use as shafts of high dimensional accuracy, e.g., aircraft gas turbine shafts.

SUMMARY OF THE INVENTION

It is an object of the present invention to provide a method of manufacturing a hollow shaft of high dimensional accuracy with ease irrespective of the material of which the hollow shaft is made.

Another object of the present invention is to provide a mandrel which is capable of holding a relatively long hollow shaft blank highly accurately when a hollow shaft is to be manufactured or inspected.

According to the present invention, there is provided a method of manufacturing a hollow shaft, comprising the steps of defining a through hole axially in a shaft blank to produce a cylindrical hollow shaft blank, inserting a mandrel in the through hole of the hollow shaft blank, holding opposite ends of the mandrel concentrically with the through hole, rotating the hollow shaft blank about its own axis while cutting an outer circumferential surface of at least one end of the hollow shaft blank concentrically with the through hole to form a reference outer circumferential surface on the at least one end of the hollow shaft blank, holding the reference outer circumferential surface, and rotating the hollow shaft blank about its own axis while cutting a predetermined thickness off an outer circumferential surface of the hollow shaft blank over a substantially entire length thereof for thereby finishing the hollow shaft blank into a hollow shaft.

The reference outer circumferential surface is formed on the end of the hollow shaft blank concentrically with the through hole while the hollow shaft blank is being held by the mandrel. When the hollow shaft blank is then finished, the hollow blank shaft does not need to be held by the blank, but its reference outer circumferential surface is held while cutting a predetermined thickness off an outer circumferential surface of the hollow shaft blank. Accordingly, the produced hollow shaft is of very high concentricity and accurate dimensions.

The mandrel comprises a main stem, a pair of extension stems smaller in diameter than the main stem and extending coaxially from respective opposite ends of the main stem, a pair of tapered shoulders extending between the main stem and the extension stems and progressively smaller in diameter from the main stem toward the extension stems, a pair of collets movably mounted respectively on the tapered shoulders, and moving means for moving the collets on the tapered shoulders, each of the collets being tubular in shape, and having a plurality of first slits extending axially from an axial end thereof to respective positions near an opposite axial end thereof, and a plurality of second slits extending axially from the opposite axial end to respective positions near the axial end thereof, the first slits and the second slits alternating with each other. The above step of holding opposite ends of the mandrel concentrically with the through hole comprises the step of, after the mandrel is inserted in the through hole of the hollow shaft blank, moving the collets toward larger-diameter portions of the tapered shoulders, respectively, thereby causing the collets to spread to press outer circumferential surfaces thereof against an inner circumferential surface of the through hole of the hollow shaft blank for holding the hollow shaft blank with the mandrel.

With the mandrel of the above structure being used, the collets are reliably held in intimate contact with the hollow shaft blank in two areas, with no clearance created between the collets and the inner circumferential surface of the through hole. The hollow shaft blank and the mandrel are thus kept highly concentric with each other to keep the concentricity of the hollow shaft blank at a high level, i.e., to eliminate a misalignment between the axes of inner and outer circumferential surfaces of the hollow shaft blank. When the hollow shaft blank is rotated through the mandrel, the hollow shaft blank is prevented from vibrating radially, and the reference outer circumferential surface can be formed highly accurately on the hollow shaft blank.

The moving means comprises a pair of joint pins extending diametrically through axially extending slots defined in the tapered shoulders, respectively, and inserted diametrically in the collets, respectively, for movement in unison with the collects axially in the slots, a pair of bars axially movably mounted in respective insertion holes defined axially in the extension stems, respectively, and having respective ends coupled to the joint pins, respectively, and a pair of screws threaded in respective outer ends of the insertion holes and rotatable to move axially in the extension stems for moving the bars, respectively, toward the main stem to cause the joint pins to move the collets respectively toward the larger-diameter portions of the tapered shoulders.

When the screws are rotated about their axes, the bars are pushed axially toward the main stem. As the bars are axially displaced, the collets are moved by the joint pins toward the larger-diameter portions of the tapered shoulders. The mandrel can thus be quickly inserted in and fixed to the hollow shaft blank.

The method further comprises the steps of providing a pair of rods supporting respective axially movable blocks and having respective retainers on ends thereof for retaining the movable blocks on the rods, the rods having respective joints on opposite ends thereof, coupling the joints to the bars, respectively, fixing the mandrel, holding the movable blocks against the retainers, respectively, and moving the movable blocks and the rods axially outwardly away from the mandrel to cause the bars to move the collets toward respective smaller-diameter portions of the tapered shoulders, thereby causing the collets to contract to release the outer circumferential surfaces thereof out of pressed contact with the inner circumferential surface of the through hole.

For removing the mandrel from the hollow shaft blank, the screws are removed, and the rods are coupled to the bars through the joints. Then, the mandrel is fixed, and the movable blocks are held against the retainers, respectively. The rods and the bars are moved axially outwardly away from the mandrel by the movable blocks. The collets are moved along the tapered shoulders by the joint pins, and are contracted to release the outer circumferential surfaces thereof out of pressed contact with the inner circumferential surface of the through hole.

After the reference outer circumferential surface has been formed, therefore, the hollow shaft blank can quickly be removed from the mandrel for the subsequent finishing process.

The step of defining the through hole axially in the shaft blank comprises the steps of boring the through hole axially in the shaft blank and honing the bored through hole.

The inner circumferential surface of the honed through hole has a highly level of roundness. Therefore, when the hollow shaft blank is supported on the mandrel, they are held highly concentric with each other, and the reference outer circumferential surface subsequently formed on the hollow shaft blank is highly accurate dimensionally.

According to the present invention, there is also provided a mandrel for holding a cylindrical hollow shaft blank by being inserted therein, comprising a main stem, a pair of extension stems smaller in diameter than the main stem and extending coaxially from respective opposite ends of the main stem, a pair of tapered shoulders extending between the main stem and the extension stems and progressively smaller in diameter from the main stem toward the extension stems, a pair of collets movably mounted respectively on the tapered shoulders, each of the collets being tubular in shape, and having a plurality of first slits extending axially from an axial end thereof to respective positions near an opposite axial end thereof, and a plurality of second slits extending axially from the opposite axial end to respective positions near the axial end thereof, the first slits and the second slits alternating with each other, the collets being spreadable radially outwardly when moving on the tapered shoulders, a pair of joint pins extending diametrically through axially extending slots defined in the tapered shoulders, respectively, and inserted diametrically in the collets, respectively, for movement in unison with the collects axially in the slots, a pair of bars axially movably mounted in respective insertion holes defined axially in the extension stems, respectively, and having respective ends coupled to the joint pins, respectively, and a pair of screws threaded in respective outer ends of the insertion holes and rotatable to move axially in the extension stems for moving the bars, respectively, toward the main stem to cause the joint pins to move the collets respectively toward the larger-diameter portions of the tapered shoulders, thereby causing the collets to spread to press outer circumferential surfaces thereof against an inner circumferential surface of the through hole of the hollow shaft blank for holding the hollow shaft blank with the mandrel.

For holding the hollow shaft blank with the mandrel, the main stem and the extension stems are inserted into the hollow shaft blank, with the collets displaced toward smaller-diameter portions of the tapered shoulders. Then, the screws are rotated about their axes to push in the bars toward the main stem. As the bars are moved toward the main stem, the collets are moved toward the larger-diameter portions of the tapered shoulders by the joint pins. As the collets move toward the larger-diameter portions of the tapered shoulders, the first and second slits are spread to increase the outside diameter of the collets. The outer circumferential surfaces of the collets are pressed intimately against the inner circumferential surface of the hollow shaft blank, which is now securely held by the main and extension stems through the collets and the tapered shoulders. Since the collets are pushed into intimate contact with the inner circumferential surface of the hollow shaft blank and the tapered shoulders when the collets are moved toward the larger-diameter portions of the tapered shoulders, the hollow shaft blank can be held highly accurately on the mandrel.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENT

A hollow shaft manufactured by a method according to the present invention is a relatively long hollow shaft, which is about 1 m long in the illustrated embodiment, typically for use as an aircraft gas turbine shaft, for example. Since a hollow shaft in such an application will rotate at a very high speed in use, the hollow shaft needs to be formed to a very high level of dimensional accuracy in order to prevent itself from vibrating radially. Aircraft gas turbine shafts are required to be made of highly strong materials. Generally, they are made of difficult-to-machine materials whose mechanical strength is greater than ordinary carbon steel. Such difficult-to-machine materials have high mechanical strength and high toughness, and include nickel-based super alloys, iron-based super alloys, stainless-steel-based alloys, titanium-based alloys, etc. Hollow shafts should preferably be made of nickel-based super alloys or stainless-steel-based alloys, and more specifically, should be made of a nickel-based super alloy known as INCO718 or a stainless-steel-based alloy known as 17-4PH. These difficult-to-machine materials are indispensable as materials of shafts that will rotate at very high speeds, such as aircraft gas turbine shafts, for example.

An elongate hollow shaft of a difficult-to-machine material is manufactured by the method according to the present invention.

Figure 1:
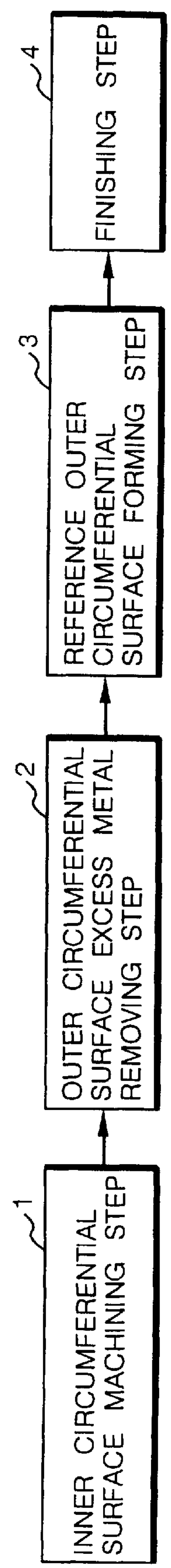
FIG. 1 is a block diagram illustrating a method of manufacturing a hollow shaft according to the present invention.
Figure 2A:
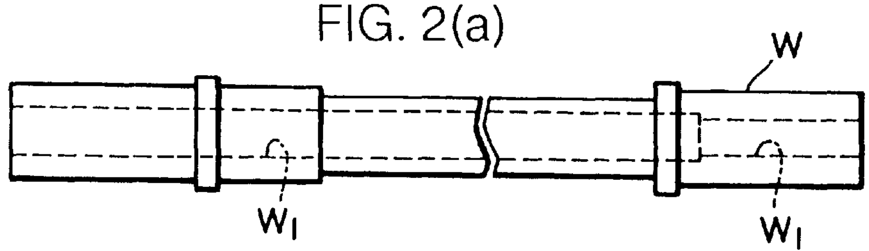
FIGS. 2(*a*), 2(*b*), 2(*c*), and 2(*d*) are views showing major successive steps of the method of manufacturing a hollow shaft.
Figure 2B:
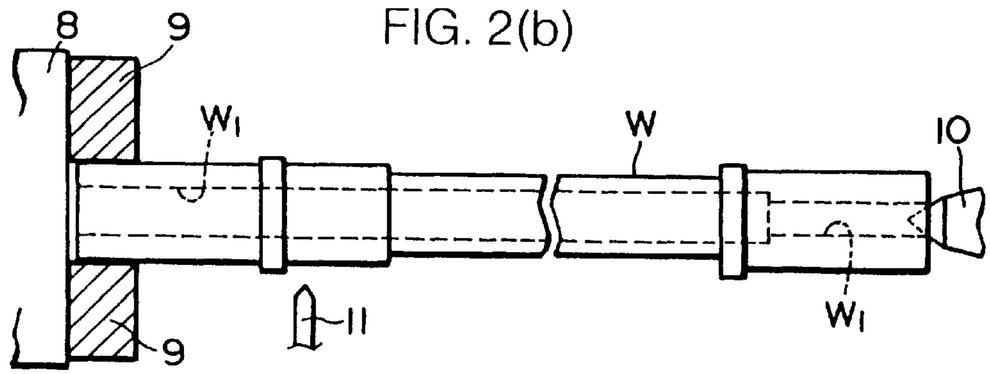
Figure 2C:
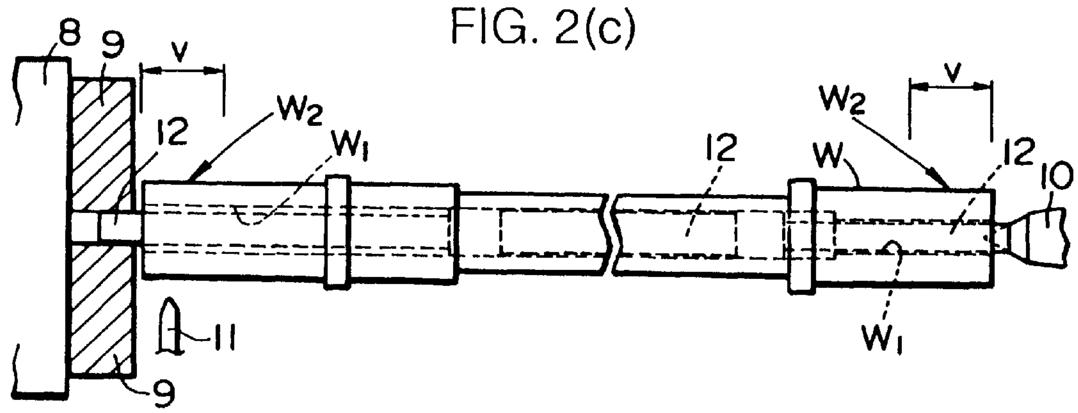
Figure 2D:
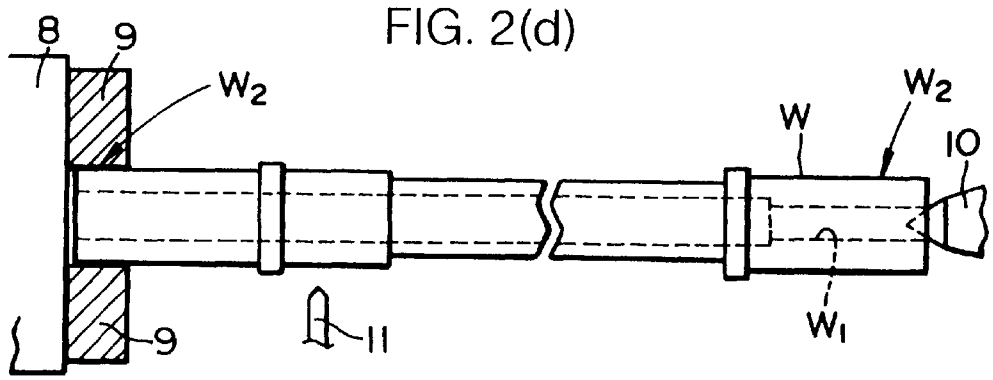

As shown in FIG. 1, the method according to the present invention comprises major successive steps including an inner circumferential surface machining step 1, an outer circumferential surface excess metal removing step 2, a reference outer circumferential surface forming step 3, and a finishing step 4.

The above major successive steps of the method according to the present invention will be described below.

In the inner circumferential surface machining step 1, as shown in FIG. 2(*a*), a through hole $W_1$ is formed axially through a solid cylindrical rod, thus producing a cylindrical hollow shaft blank W. The through hole $W_1$ is bored substantially axially in the solid cylindrical rod, and honed to provide a smooth inner circumferential surface.

The through hole $W_1$ may be bored by a known BTA (Boring Trepanning Association) boring machine. While a hole is being bored in a hollow shaft blank by a BTA boring machine, a cutting fluid is introduced between the inner circumferential surface of the hole and the boring shaft, and chips are collected together with the cutting fluid from the tip end of the boring shaft. According to the BTA boring machine, chips can be discharged highly efficiently, and the inner circumferential surface of the hole can be finished highly smoothly because the chips do not contact the inner circumferential surface of the hole.

The through hole $W_1$ is honed to remove scratches and other flaws from the inner circumferential surface of the hole, which have been formed in the boring process. The inner circumferential surface of the honed through hole $W_1$ has a highly level of roundness.

In the next outer circumferential surface excess metal removing step 2, as shown in FIG. 2(*b*), an end of the hollow shaft blank W is held by a plurality of radially movable gripping fingers 9 mounted on an end of a rotatable shaft of a lathe 8, and the other end of the hollow shaft blank W is supported by a center 10 that enters an end of the through hole $W_1$. Any excess metal on the outer circumferential surface of the hollow shaft blank W is cut off by a cutting tool 11. The outer circumferential surface excess metal removing step 2 is carried out for the purpose of reducing the weight of the hollow shaft blank W. Therefore, the axis of the inner circumferential surface of the honed through hole $W_1$ and the axis of the outer circumferential surface of the hollow shaft blank W are not yet made concentric with each other.

In the next reference outer circumferential surface forming step 3, as shown in FIG. 2(*c*), a mandrel 12 is inserted into the through hole $W_1$ of the hollow shaft blank W. An end of the mandrel 12 is held by the gripping fingers 9, and the other end thereof is supported by the center 10. Structural details of the mandrel 12 will be described later on. The hollow shaft blank W is now rotated through the mandrel 12, and opposite end ranges v, each about 50 mm long in the illustrated embodiment, of the hollow shaft blank W are cut by the cutting tool 11 to form a pair of outer circumferential surfaces $W_2$ concentric with the inner circumferential surface of the through hole $W_1$. Since the inner circumferential surface of the through hole $W_1$ has a highly level of roundness achieved in the inner circumferential surface machining step 1, the hollow shaft blank W can easily be axially centered when the mandrel 12 is inserted in the through hole $W_1$ of the hollow shaft blank W. Accordingly, the outer circumferential surfaces $W_2$ formed in the respective opposite end ranges v of the hollow shaft blank W is highly concentric with the inner circumferential surface of the through hole $W_1$.

Figure 3:
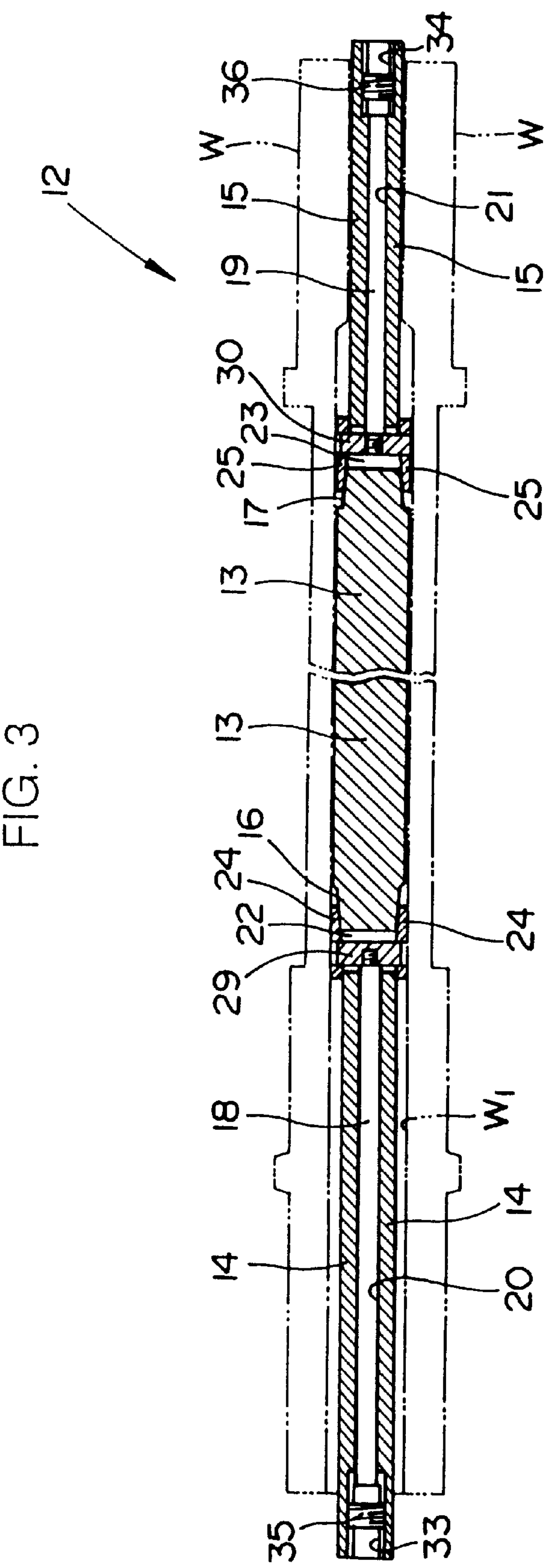
FIG. 3 is an axial cross-sectional view of a mandrel according to the present invention.
Figure 4A:
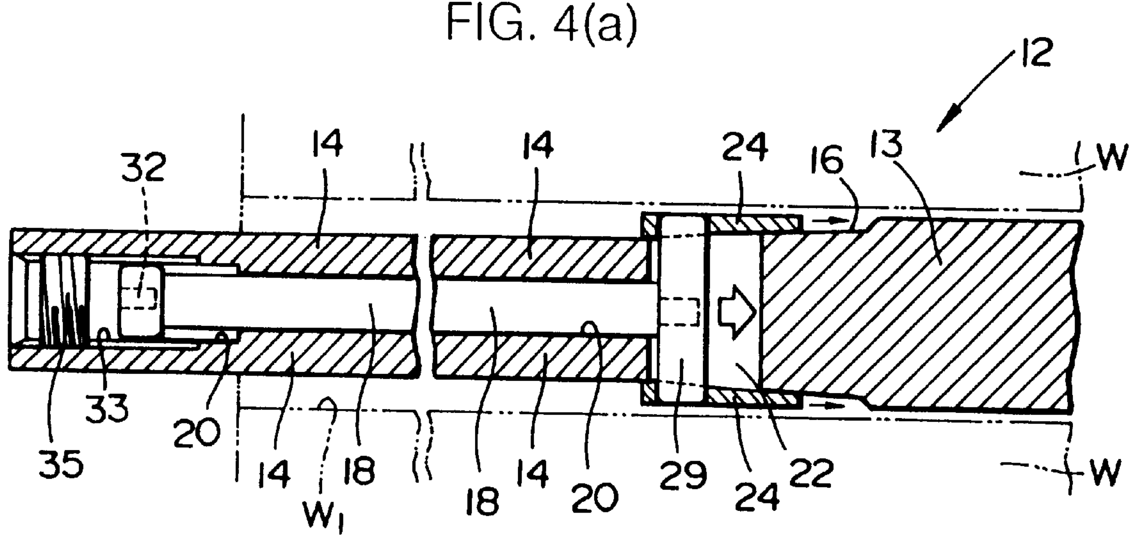
FIGS. 4(*a*) and 4(*b*) are fragmentary axial cross-sectional views showing the manner in which the mandrel shown in FIG. 3 is inserted into a hollow shaft blank.
Figure 4B:
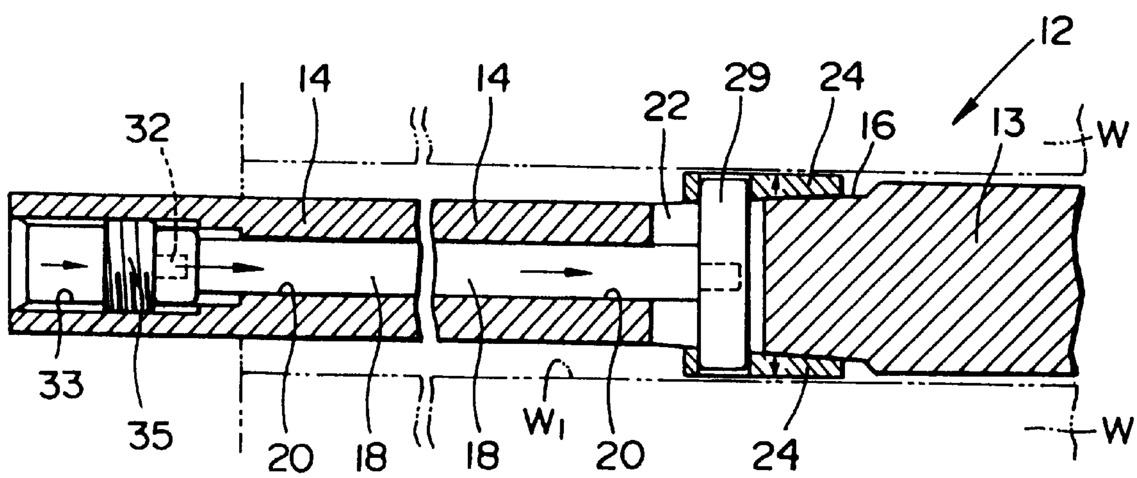

The mandrel 12 will be described below. As shown in FIG. 3, the mandrel 12 comprises a cylindrical main stem 13 and a pair of extension stems 14, 15 extending from respective opposite ends of the main stem 13 coaxially with the main stem 13. The mandrel 12 has a pair of tapered shoulders 16, 17 extending axially between the main stem 13 and the extension stems 14, 15. The main stem 13, the tapered shoulders 16, 17, and the extension stems 14, 15 are integral coaxially with each other. The extension stems 14, 15 are smaller in diameter than the main stem 13, and have respective insertion holes 20, 21 defined coaxially therein. Bars 18, 19 are removably inserted in the respective insertion holes 20, 21. As shown in FIGS. 3 and 4(*a*), the tapered shoulders 16, 17 between the main stem 13 and the extension stems 14, 15 are progressively smaller in diameter from the main stem 13 toward the extension stems 14, 15. The tapered shoulders 16, 17 have respective diametrical slots 22, 23 defined therein near the extension stems 14, 15 and extending axially in the tapered shoulders 16, 17.

Tubular collets 24, 25 are axially movably mounted on the tapered shoulders 16, 17, respectively. The tubular collets 24, 25 are expandable radially outwardly. The tubular collets 24, 25 have respective inner circumferential surfaces complementary in shape to the outer circumferential surfaces of the tapered shoulders 16, 17, respectively. Specifically, the inner circumferential surfaces of the tubular collets 24, 25 are progressively smaller in diameter from larger-diameter portions toward smaller-diameter portions of the tapered shoulders 16, 17.

Figure 5A:
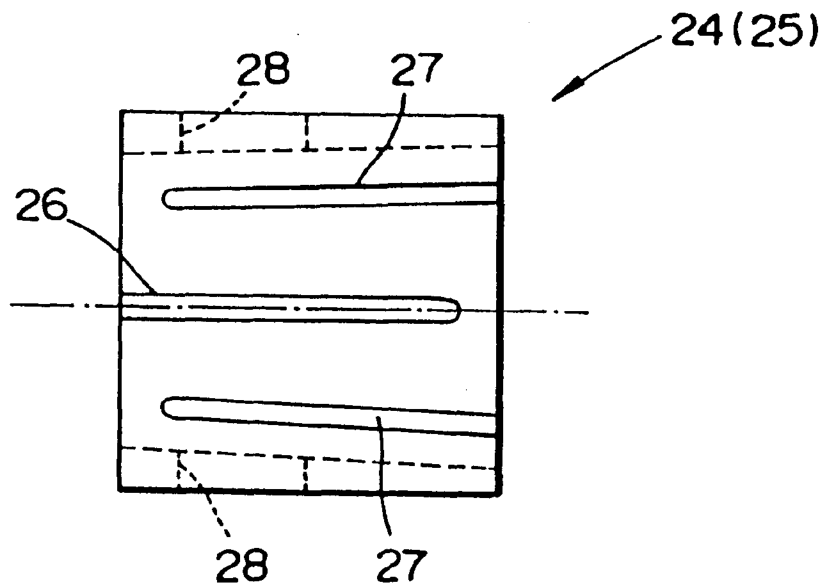
FIGS. 5(*a*) and 5(*b*) are views of a collet on the mandrel shown in FIG. 3.
Figure 5B:
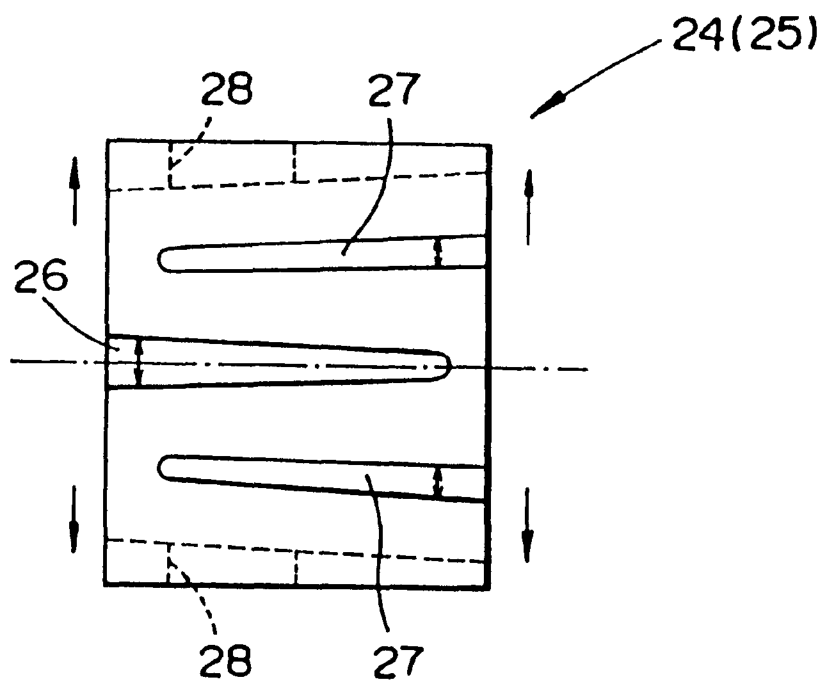

As shown in FIG. 5(*a*), the tubular collets 24, 25 have a plurality of circumferentially spaced first slits 26 defined therein which extend axially from an axial end thereof to respective positions near the opposite axial end thereof, and a plurality of circumferentially spaced second slits 27 defined therein which extend axially from the opposite axial end to respective positions near the axial end thereof. The first slits 26 and the second slits 27 alternate with other in the circumferential direction of the tubular collets 24, 25. When the tubular collets 24, 25 are positioned near the smaller-diameter portions of the tapered shoulders 16, 17, i.e., near the extension stems 14, 15, the tubular collets 24, 25 have a smaller outside diameter as shown in FIG. 5(*a*). When the tubular collets 24, 25 are positioned near the larger-diameter portions of the tapered shoulders 16, 17, i.e., near the main stem 13, the tubular collets 24, 25 have a larger outside diameter as shown in FIG. 5(*b*).

The tubular collets 24, 25 have respective through holes 28 defined diametrically therein. As shown in FIGS. 3 and 4(*a*), joint pins 29, 30 are inserted in the slots 22, 23 and the holes 28. The joint pins 29, 30 are coupled to respective inner ends of the bars 18, 19. When the bars 18, 19 are moved axially in the extension stems 14, 15, the joint pins 29, 30 are moved axially in the slots 22, 23, moving the tubular collets 24, 25 along the tapered shoulders 16, 17. The joint pins 29, 30 and the bars 18, 19 jointly make up a displacing means for displacing the tubular collets 24, 25 along the tapered shoulders 16, 17. As shown in FIG. 4(*a*), internally threaded holes 32 are defined in respective outer ends of the bars 18, 19 for connection to a mandrel remover 31 (described later on).

As shown in FIGS. 3 and 4(*a*), the extension stems 14, 15 have internally threaded surfaces 33, 34, respectively, on inner walls that define the insertion holes 20, 21 at outer ends of the extension stems 14, 15. Screws 35, 36 are held in threaded engagement with the internally threaded surfaces 33, 34, respectively. The screws 35, 36 have wrench holes (not shown) defined axially in outer ends thereof, and can be rotated by a wrench whose tip is inserted in the wrench holes.

A process of holding the hollow shaft blank W on the mandrel 12 will be described below with reference to FIGS. 4(*a*) and 4(*b*). In FIGS. 4(*a*) and 4(*b*), only a left-hand half of the mandrel 12 shown in FIG. 3 is illustrated, and operation of the tapered shoulder 16 and the tubular collet 24 will be described with reference to FIGS. 4(*a*) and 4(*b*). Operation of the other tapered shoulder 17 and the other tubular collet 25 which are not shown in FIGS. 4(*a*) and 4(*b*) will not be described below as it is the same as the operation of the tapered shoulder 16 and the tubular collet 24.

As shown in FIG. 4(*a*), the mandrel 12 is inserted into a desired position in the hollow shaft blank W. At this time, the tubular collet 24 is positioned near the smaller-diameter portion of the tapered shoulder 16, i.e., near the extension stem 14, and hence has a smaller outside diameter. Then, the screw 35 is inserted into threaded engagement with the internally threaded surface 33. The screw 35 is turned to move the bar 18 axially toward the main stem 13.

As shown in FIG. 4(*b*), the bar 18 is axially moved to displace the joint pin 29 in and along the slot 22 in the tapered shoulder 16 axially toward the main stem 13, thus moving the tubular collet 24 toward the larger-diameter portion of the tapered shoulder 16, i.e., toward the main stem 13. As the tubular collet 24 thus moves, the slits 26, 27 thereof are spread by the larger-diameter portion of the tapered shoulder 16, and the outside diameter of the tubular collet 24 is increased thereby to press the outer circumferential surface of the tubular collet 24 against the inner wall of the hollow shaft blank W. Since the tubular collet 24 is pressed radially between the tapered shoulder 16 and the hollow shaft blank W, the tubular collet 24, the tapered shoulder 16, and the main stem 13 are kept coaxial with each other against axial misalignment.

Inasmuch as the hollow shaft blank W, though it is relatively long, can be supported on the mandrel 12 through the tubular collets 24, 25 with high positional accuracy, the hollow shaft blank W can be machined highly accurately by the cutting tool 11 to form the outer circumferential surfaces $W_2$ in the reference outer circumferential surface forming step 3. If the hollow shaft blank W is made of a difficult-to-machine material such as a nickel-based super alloy or a stainless-steel-based alloy, then the cutting tool 11 is subject to relatively large resistance. However, the hollow shaft blank W can be cut highly accurately without allowing the mandrel 12 to rotate relatively to the hollow shaft blank W because the hollow shaft blank W is firmly supported by the mandrel 12.

In the finishing step 4, as shown in FIG. 2(*d*), the mandrel 12 is removed from the hollow shaft blank W, and the outer circumferential surface $W_2$ on one end of the hollow shaft blank W which was formed in the reference outer circumferential surface forming step 3 is held by the gripping fingers 9 of the lathe 8, and the other end of the hollow shaft blank W is supported by the center 10 entering the end of the through hole $W_1$. Then, the cutting tool 11 cuts a certain thickness off the outer circumferential surface of the hollow shaft blank W over its substantially entire length.

In the finishing step 4, furthermore, the outer and inner circumferential surfaces of the hollow shaft blank W are finished by an NC machining process using the outer circumferential surfaces $W_2$ as a reference. As a result, an elongate hollow shaft of high dimensional accuracy is produced.

Figure 6:
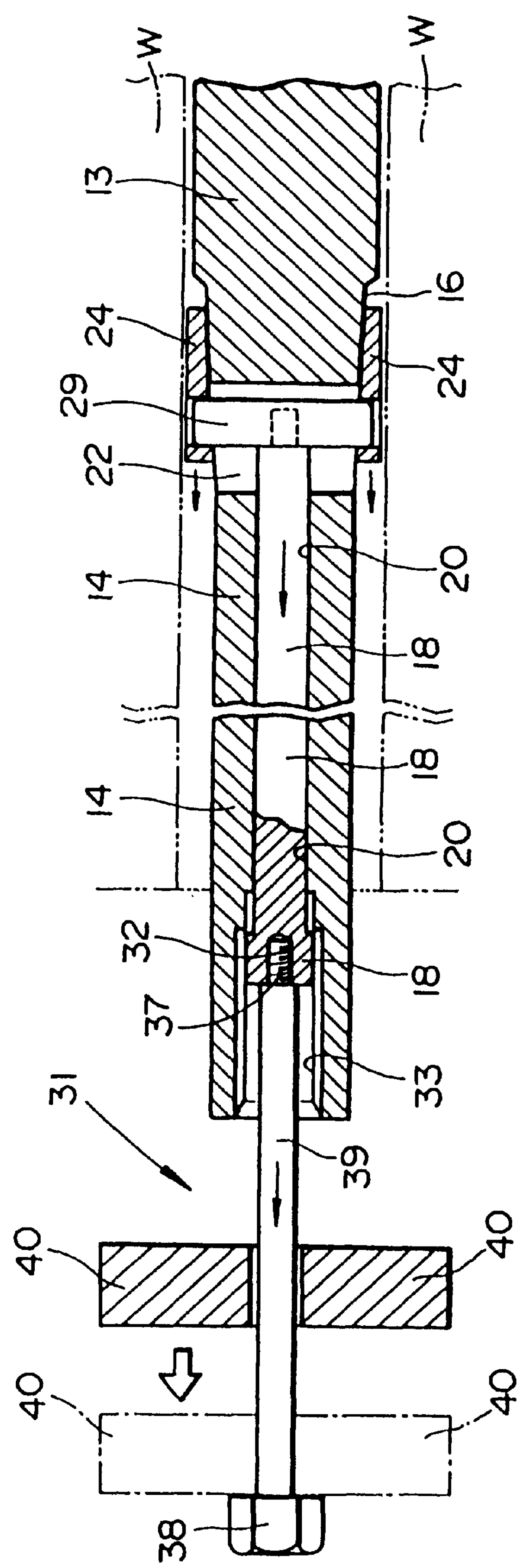
FIG. 6 is a fragmentary axial cross-sectional view of a mandrel remover for removing the mandrel shown in FIG. 3.

Prior to the finishing step 4, the mandrel 12 is removed from the hollow shaft blank W. To remove the mandrel 12 from the hollow shaft blank W, a mandrel remover 31 shown in FIG. 6 is employed. The mandrel remover 31 comprises a rod 39 having an externally threaded end (joint) 37 and a bolt head (retainer) 38 mounted on an end opposite to the externally threaded end 37, and a movable block 40 movably mounted on the rod 39 and retained thereon by the bolt head 38.

The mandrel 12 is removed from the hollow shaft blank W by the mandrel remover 31 as follows: The screw 35 is detached from the bar 18, and the externally threaded end 37 of the rod 39 is threaded into the internally threaded hole 32 in the outer end of the bar 18 to connect the rod 39 to the bar 18.

Then, the mandrel 12 is fixed in position, and the movable block 40 is held against the bolt head 38. The movable block 40 is displaced away from the mandrel 12 to move the rod 39 and the bar 18 axially outwardly. When the movable block 40 is axially moved back and forth on the rod 39 to hit the bolt head 38 several times, the rod 39 and the bar 18 can easily be moved axially outwardly.

When the bar 18 is axially moved outwardly, the joint pin 29 is moved in and along the slot 22 in the tapered shoulder 16 toward the extension stem 14, displacing the tubular collet 24 toward the smaller-diameter portion of the tapered shoulder 16, i.e., toward the extension stem 14. The slits 26, 27 of the tubular collet 24 are contracted, and the outside diameter of the tubular collet 24 is reduced for thereby releasing the tubular collet 24 from pressed contact with the hollow shaft blank W. While only the tubular collet 24 is shown in FIG. 6, the other collet 25 is also axially displaced out of pressed contact with the hollow shaft blank W. The mandrel 12 can now removed from the hollow shaft blank W easily and quickly.

In the above embodiment, since the outer circumferential surfaces $W_2$ are formed as a reference in the respective opposite end ranges v of the hollow shaft blank W in the reference outer circumferential surface forming step 3, the hollow shaft blank W can be held in position using the outer circumferential surfaces $W_2$ as a reference and can be finished highly accurately in the finishing step 3.

Figure 7:
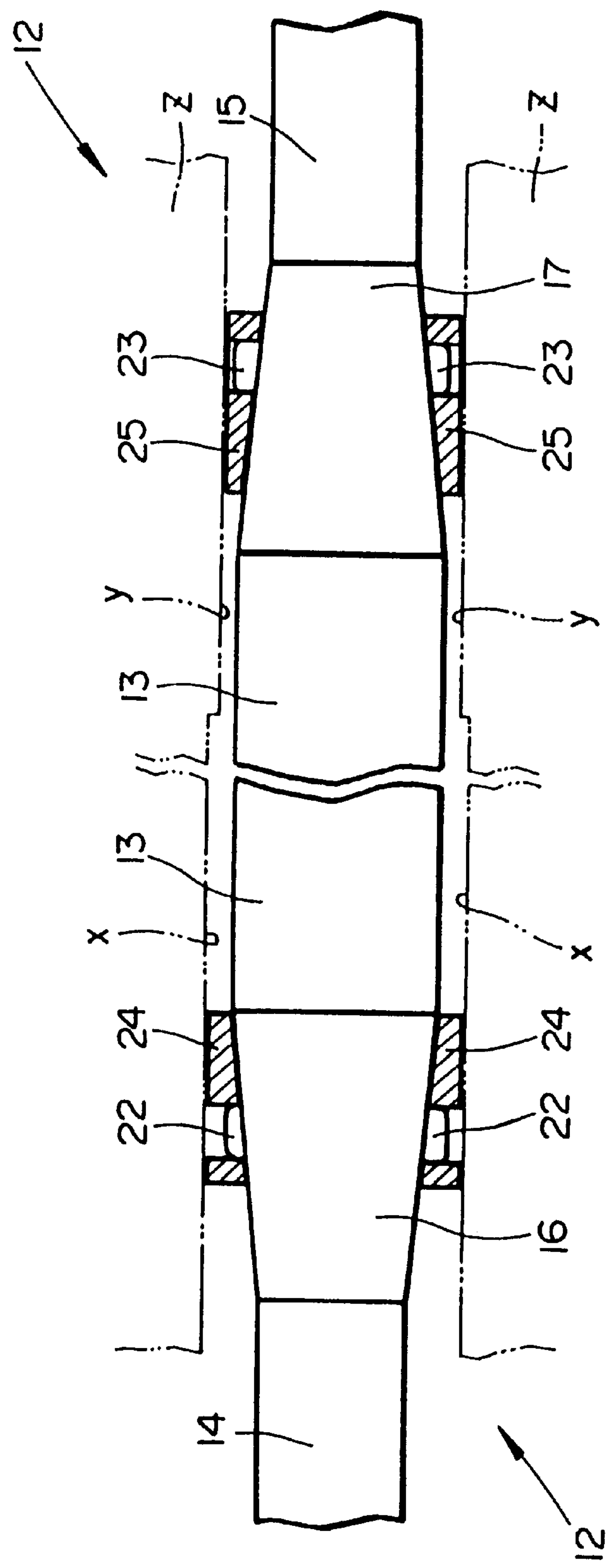
FIG. 7 is a view showing the manner in which a hollow shaft blank of another shape is held by the mandrel shown in FIG. 3.
Figure 8:
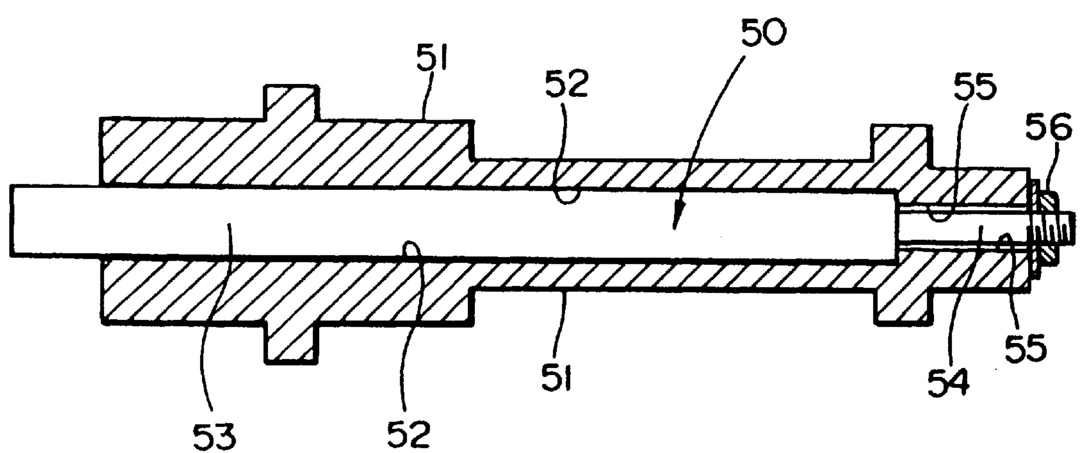
FIG. 8 is an axial cross-sectional view showing the manner in which a hollow shaft blank is held by a conventional mandrel.

In the above embodiment, the tubular collets 24, 25 are pressed against respective inner circumferential surfaces of the hollow shaft blank W which have the same inside diameter. However, the mandrel 12 according to the present invention is capable of accurately holding a cylindrical workpiece with a stepped inner circumferential surface including larger- and smaller-diameter portions. FIG. 7 shows the manner in which a hollow shaft blank having such a stepped inner circumferential surface is held by the mandrel shown in FIG. 3. As shown in FIG. 7, a workpiece or a hollow shaft blank Z has a stepped inner circumferential surface including larger- and smaller-diameter portions x, y. The tubular collets 24, 25 are axially moved to respective positions in which their outside diameters correspond respectively to the larger- and smaller-diameter portions x, y of the hollow shaft blank Z. Since the tubular collets 24, 25 are held in pressed contact with the larger- and smaller-diameter portions x, y, the mandrel 12 can hold the hollow shaft blank Z highly accurately. Alternatively, two tubular collets may have different wall thicknesses, and the tubular collet with the greater wall thickness may be pressed against the larger-diameter portion x of the hollow shaft blank Z whereas the tubular collet with the smaller wall thickness may be pressed against the smaller-diameter portion y of the hollow shaft blank Z.

The mandrel 12 shown above in the illustrated embodiment is most preferable for use with the hollow shaft bank W. However, any of various other mandrels different in structure from the mandrel 12 may be employed insofar as it can firmly hold the hollow blank shaft W with no clearance created between the mandrel and the inner circumferential surface of the through hole $W_1$ when the mandrel is inserted in the through hole $W_1$.

Although a certain preferred embodiment of the present invention has been shown and described in detail, it should be understood that various changes and modifications may be made therein without departing from the scope of the appended claims.

What is claimed is:

1. A method of manufacturing a hollow shaft, comprising the steps of:

defining a through hole axially in a shaft blank to produce a cylindrical hollow shaft blank;

inserting a mandrel in said through hole of the hollow shaft blank;

holding opposite ends of said mandrel concentrically with said through hole;

rotating said hollow shaft blank about the axis of the through hole while cutting an outer circumferential surface of at least one end of said hollow shaft blank concentrically with said through hole to form a reference outer circumferential surface on said at least one end of the hollow shaft blank;

holding said reference outer circumferential surface; and rotating said hollow shaft blank about the axis of the through hole while cutting a predetermined thickness off an outer circumferential surface of said hollow shaft blank over a substantially entire length thereof for thereby finishing said hollow shaft blank into a hollow shaft.

2. A method according to claim 1, wherein said step of defining the through hole axially in the shaft blank comprises the steps of boring the through hole axially in the shaft blank and honing the bored through hole.

3. A method according to claim 1, and further including the step of selecting said hollow shaft blank of a difficult-to-machine material inducing nickel-based super alloys and stainless-steel-based alloys.

4. A mandrel for holding a cylindrical hollow shaft blank by being inserted therein, comprising:

a main stem;

a pair of extension stems smaller in diameter than said main stem and extending coaxially from respective opposite ends of said main stem;

a pair of tapered shoulders extending between said main stem and said extension stems and progressively smaller in diameter from said main stem toward said extension stems;

a pair of collets movably mounted respectively on said tapered shoulders, each of said collets being tubular in shape, and having a plurality of first slits extending axially from an axial end thereof to respective positions near an opposite axial end thereof, and a plurality of second slits extending axially from said opposite axial end to respective positions near said axial end thereof, said first slits and said second slits alternating with each other, said collets being spreadable radially outwardly when moving on said tapered shoulders;

a pair of joint pins extending diametrically through axially extending slots defined in said tapered shoulders, respectively, and inserted diametrically in said collets, respectively, for movement in unison with said collects axially in said slots;

a pair of bars axially movably mounted in respective insertion holes defined axially in said extension stems, respectively, and having respective ends coupled to said joint pins, respectively; and a pair of screws threaded in respective outer ends of said insertion holes and rotatable to move axially in said extension stems for moving said bars, respectively, toward said main stem to cause said joint pins to move said collets respectively toward said larger-diameter portions of said tapered shoulders, thereby causing said collets to spread to press outer circumferential surfaces thereof against an inner circumferential surface of a through hole of the hollow shaft blank for holding said hollow shaft blank with said mandrel.

5. A mandrel for holding a cylindrical hollow shaft blank by being inserted therein, comprising:

a main stem;

a pair of extension stems smaller in a diameter than said main stem and extending coaxially from respective opposite ends of said main stem;

a pair of tapered shoulders extending between said main stem and said extension stems and progressively smaller in diameter from said main stem toward said extension stems;

a pair of collets movably mounted respectively on said tapered shoulders, each of said collets being tubular in shape, and having a plurality of first slits extending axially from an axial end thereof to respective positions near an opposite axial end thereof, and a plurality of second slits extending axially from said opposite axial end to respective positions near said axial end thereof, said first slits and said second slits alternating with each other, said collets being spreadable radially outwardly when moving on said tapered shoulders; and moving means for moving said collets respectively toward said larger-diameter portions of said tapered shoulders, thereby causing said collets to spread to press outer circumferential surfaces thereof against an inner circumferential surface of a through hole of the hollow shaft blank for holding said hollow shaft blank with said mandrel.

6. A mandrel according to claim 5, wherein said moving means comprises:

a pair of joint pins extending diametrically through axially extending slots defined in said tapered shoulders, respectively, and inserted diametrically in said collets, respectively, for movement in unison with said collets axially in said slots;

a pair of bars axially movably mounted in respective insertion holes defined axially in said extension stems, respectively, and having respective ends coupled to said joint pins, respectively; and a pair of screws threaded in respective outer ends of said insertion holes and rotatable to move axially in said extension stems for moving said bars, respectively, toward said main stem to cause said joint pins to move said collets respectively toward said larger-diameter portions of said tapered shoulders.

7. A mandrel according to claim 6, further comprising:

a pair of rods having joints on ends of thereof for being coupled to said bars and having respective retainers on ends thereof;

a pair of axially movable blocks supported by said rods respectively for colliding against said retainers to move said collets respectively toward said small-diameter portion of said tapered shoulders, thereby causing said collets to contract to release the outer circumferential surfaces thereof out of pressed contact with the inner circumferential surface of said through hole.

8. A mandrel according to claim 5, wherein said hollow shaft blank is made of one of difficult-to-machine materials including nickel-based super alloys and stainless-steel-based alloys.

* * * * *